Nov. 30, 1937.  J. O. ALMEN ET AL  2,100,464
FRICTION CLUTCH
Filed Sept. 28, 1936   3 Sheets-Sheet 1

Inventors
John O. Almen &
Henry J. Kitschner
By Blackmore, Sewer & Flint
Attorneys Nov. 30, 1937.   J. O. ALMEN ET AL   2,100,464
FRICTION CLUTCH
Filed Sept. 28, 1936   3 Sheets-Sheet 2

Inventors
John O. Almen &
Henry J. Kitschnet
By Blackmore, Spencer & Flint
Attorneys Nov. 30, 1937.  J. O. ALMEN ET AL  2,100,464
FRICTION CLUTCH
Filed Sept. 28, 1936   3 Sheets-Sheet 3

Inventors
John O. Almen &
Henry J. Kitschnet
By Blackmore, Spencer & Flint
Attorneys Patented Nov. 30, 1937

2,100,464

UNITED STATES PATENT OFFICE 2,100,464

FRICTION CLUTCH

John O. Almen, Royal Oak, and Henry J. Kirschner, Detroit, Mich., assignors to General Motors Corporation, Detroit, Mich., a corporation of Delaware Application September 28, 1936, Serial No. 102,886

12 Claims. (Cl. 192—68)

This invention relates to clutches and the novel structure has been designed more particularly as an improvement in a clutch for coupling the engine shaft and the transmission shaft of a motor vehicle.

An object of the invention is to provide an improved spring, useful in other relations, but particularly in a vehicle clutch as stated above.

A further object, relating to the use of the novel spring in a vehicle clutch, is to provide a spring having a relatively long range of deflection throughout which the pressures required to produce the deflection change but little, whereby the clutch action is not greatly sensitive to excessive facing wear.

Another and specific object is to make a clutch spring in the form of an annulus formed with radial corrugations progressively decreasing in circumferential extent from its outer to its inner periphery, parts of the clutch being received within said corrugations, whereby driving torque is transmitted and radial slipping is prevented.

Still other objects associated with the foregoing include the accurate centering of the conventional pressure plate, an improved location of the region of support for the spring and of the region of loading, simplicity of construction, elimination of frictional losses, reduction in weight and a lesser cost of manufacture.

In the drawings accompanying this description:

Figures 1, 2, 3:
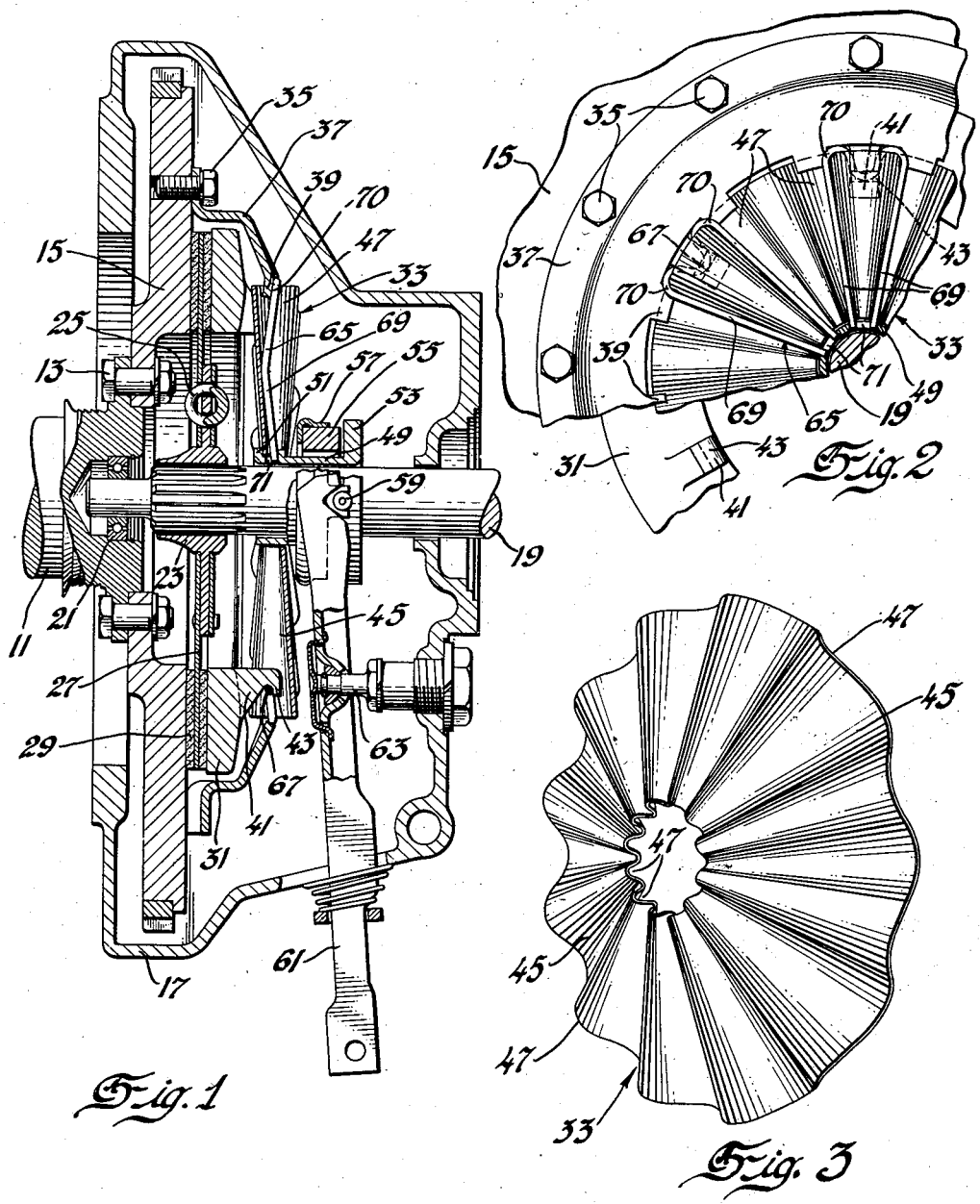
Fig. 1 is a transverse section through the novel clutch.
Fig. 2 is a view in elevation, partly broken away.
Fig. 3 is a view of the novel clutch spring in perspective.

Referring by numerals to Figs. 1 to 3 of the drawings, 11 is the engine crank shaft. It is fastened at 13 to the flywheel 15. The flywheel and the clutch are enclosed in a housing 17. The driven or transmission shaft 19 is piloted into the end of the crank shaft at 21. Shaft 19 carries a hub 23 to which is secured through a known cushioning device 25 a driven plate 27 having facings 29. Numeral 31 is the pressure plate and is adapted to be advanced toward the flywheel by a spring marked 33 to grip the driven plate between itself and the flywheel. Secured at spaced points 35 on the flywheel is an annular abutment plate 37 having spaced tongues 39. Circumferentially spaced relative to the tongues 39 of the plate 37 are axial lugs 41 on the pressure plate, the lugs formed with hook-like ends 43.

The spring 33 is of the Belleville washer type. It is coned as is usual with such resilient devices. It is formed with uniform thickness throughout. There are radially extending corrugations whereby there are formed grooves 45 facing toward the flywheel and grooves 47 on the opposite side. The corrugations have a progressively lesser circumferential extent from the outer periphery toward the center opening. The side walls near the center extend more nearly axially and stiffen the plate resisting bending from its normal position of rest, but the greater quantity of material in the walls makes for greater resiliency in axial movement.

The tongues 39 are received within the grooves 47 and the lugs 41 enter the grooves 45. Rotation of the flywheel and plate 37 is thus communicated to spring 33 by the fit of the tongues 39 in grooves 47 and the rotation of the spring is similarly transmitted to the pressure plate by the walls of grooves 45 fitting the lugs 41. By this construction frictionally sliding driving lugs between the pressure plate and flywheel are avoided. The taper of the grooves prevents radial slipping of the pressure plate and accommodates its accurate centering.

When the spring is assembled as described above and as shown, it is distorted slightly and tensioned to bias the pressure plate into clutch engaging position. The stressed condition may be appreciated by assuming that if the cone were without loading stress its apex would be somewhat to the left of the position shown in Fig. 1, but the apex has been moved somewhat toward the right in the act of assembling the spring with the parts 39 and 41. With the parts so assembled the spring tension holds the pressure plate engaged owing to the distortion of the annular band of the spring between the circles of contact defined by parts 39 and parts 41. To release the clutch, one pulls the region at the apex still further to the right. Since the region at 39 is fixed, the pressure is relieved in the circle of contact at 41. To accomplish this release, there is used a sleeve 49 surrounding shaft 19. At one end of the sleeve is a flange 51 to engage and pull on the apex of the conical spring. There is no loading at this point when the clutch is engaged since the engaged clutch elements receive the spring load. At the other end of sleeve 49 is a flange 53 adapted to be engaged by a throw-out member 55. This may be an antifriction bearing or a body of graphite. The throw-out member is mounted in a collar 57. The collar carries diametrically opposite trunnions 59, as is customary, which are engaged by the forked ends of a conventional lever 61 pivoted by any preferred form of fulcrum device, such as 63, carried by the housing 17. When the lever 61 is rocked with a clockwise rotation, the sleeve is moved to the right, the region of the spring cone adjacent its apex is similarly moved and the spring load is then assumed by the sleeve and the pressure on the pressure plate is positively released.

It is desirable in clutch release not only to release the spring pressure from the pressure plate but to provide means to positively move the pressure plate from engagement with the driven plate. For that purpose the following additional structure is used. A hairpin-like wire member designated as a whole by numeral 65 is formed with an inwardly bent part 67 located within the notch 43. On either side of part 67 the wire is carried up over the edges of the spring 33 from groove 45 and into adjacent grooves 47. Within grooves 47 the upper ends of the wire engage lugs 39 at 70 from which the leg portions 69 extend throughout the length of the grooves 47, engage the base of the groove throughout a part of this extent and finally enter the rear end of openings 71 provided therefor on the sleeve 49. When the clutch is being released and after the spring load on the pressure plate is relieved, the inner ends of legs 69 are picked up, whereupon the wire member 65 pivots at 70, its engagement with the fixed member, and by means of the connection at 43 the pressure plate is lifted from the driven plate.

Figure 4:
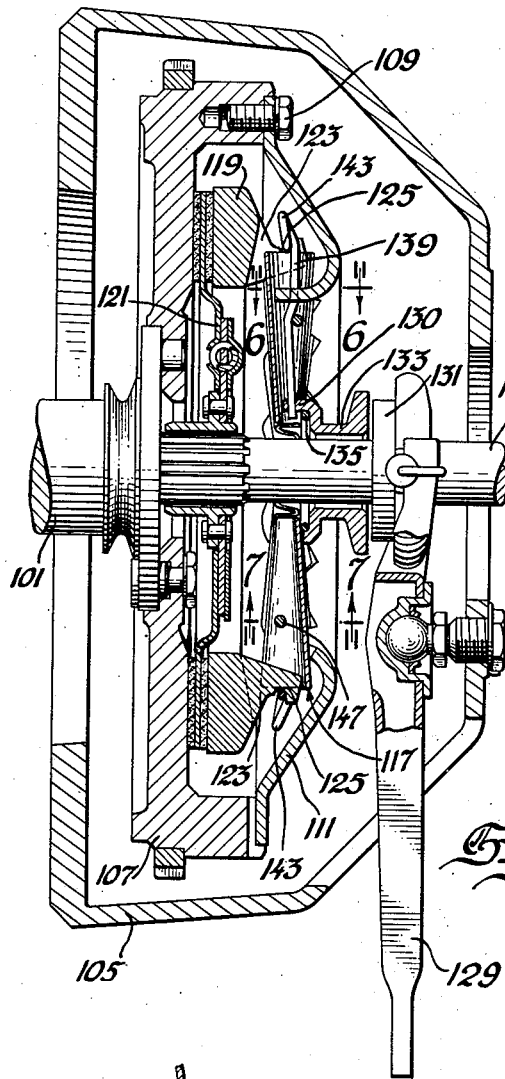
Fig. 4 is a transverse section of a modified form.
Figure 5:
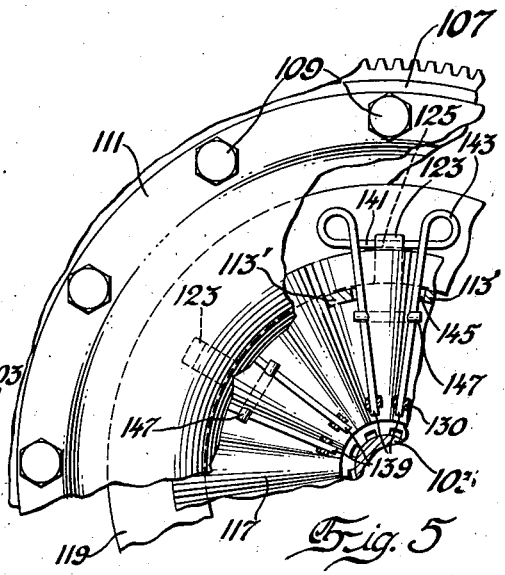
Fig. 5 is a view in elevation of this second form, partly broken away.
Figure 6:
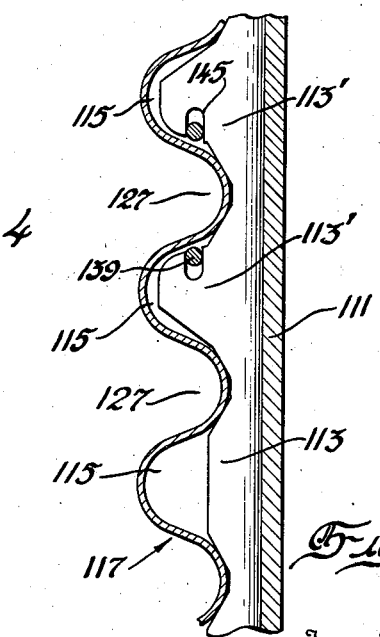
Fig. 6 is a developed view as seen from line 6—6 of Fig. 4.
Figure 7:
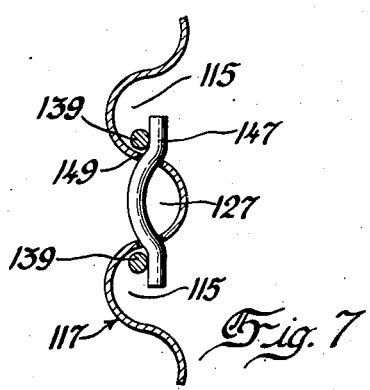
Fig. 7 is a similar view from line 7—7 of Fig. 4.

Fig. 4 shows a second embodiment. Numeral 101 is used to designate the crank shaft and 103 is the transmission shaft. Clutch housing 105 protects the flywheel 107 carried by the engine shaft and it also houses the clutch mechanism. Secured at 109 to the flywheel is an annular plate 111 formed with spaced forwardly directed extensions 113 entering the rearwardly facing grooves 115 of a corrugated clutch spring 117 corresponding to the spring of Fig. 1. Differing from the form first described, the extensions 113 are radially inward of, instead of outwardly from, the pressure plate lugs. The pressure plate is marked 119 and is adapted to grip the driven plate 121 secured to shaft 103. The pressure plate has lugs 123 with notches 125, these lugs entering the forwardly opening grooves 127 of the spring. In this form of the invention the spring is given an initial tension in assembling it relative to the parts 113 and 119. This is accomplished by pressing the apex of the cone shaped spring toward the left. Since in this form the pressure plate contact is radially outwardly of region 113, it will be appreciated that, in assembling, the stress in the annular band between the pressure plate contact and the contact with parts 113 is such as to tend to move the apex region of the cone toward the right from its position when unloaded. The load is taken by the engagement between the pressure plate and driven plate. At the center is a sliding collar 133 adapted to be moved to the left by a lever 129 acting on the collar by means of a trunnion block 131. The collar 133 is formed with axial lugs 130, forming a shoulder for a ring 135 engaging the spring cone adjacent its apex. As the lever is rocked counterclockwise, the collar is moved to the left and the coned spring further deflected. This action, unlike that of the releasing action shown by Fig. 1, does not tend to take the load off the pressure plate. To positively move the pressure plate away from the driven plate, a wire rod is used. It has legs 139 extending through grooves 115 held therein by a retainer 147 supported in apertures 149 as is shown by Fig. 7. The legs then extend through and fulcrum in slots 145 formed on somewhat elongated parts 113' in those of the grooves through which the legs extend. Just beyond the outer periphery of the conical spring, the legs are connected by loops 143 with a cross wire 141 passing through the hook 125 of the lug 123. Rotation of the lever 129 causes the legs 139 to rock about the walls of the slots 145 as a fulcrum and to pull the pressure plate from the driven plate.

Figures 8, 9:
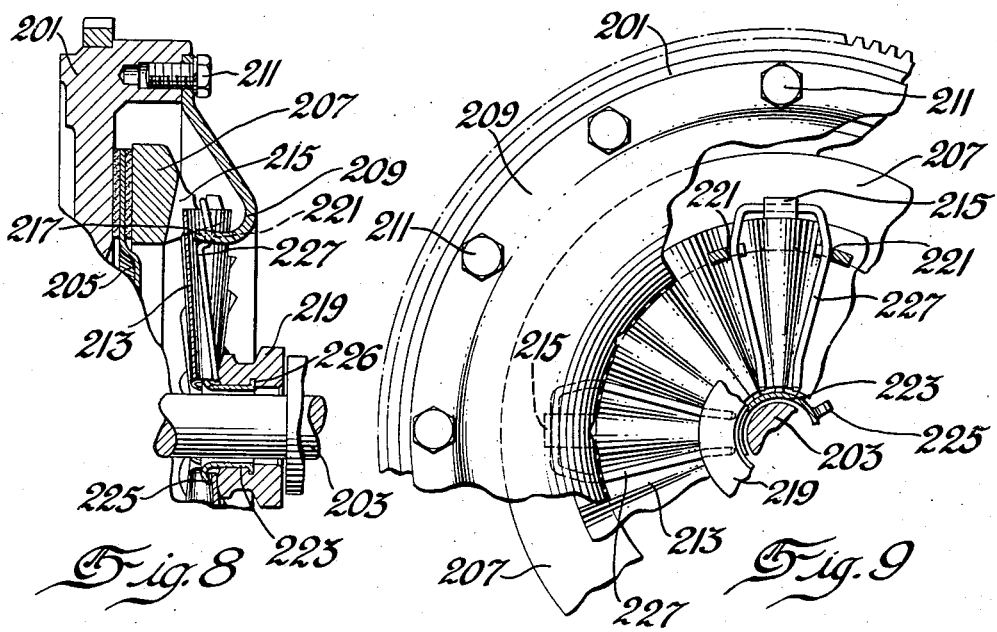
Fig. 8 is a transverse section through a modified form.
Fig. 9 is a view in elevation, with parts broken away, of the invention shown by Fig. 8.

A third embodiment is shown in Figs. 8 and 9. In these figures 201 is the flywheel and 203 is the clutch driven shaft. Numeral 205 is applied to the driven plate and the pressure plate is marked 207. The anchor plate 209 is secured at 211 to the flywheel. The spring 213 is like the spring of Fig. 4. The tongues 215 of the pressure plate enter the forwardly open corrugations and the extensions 217 of the anchor plate 209 enter the rearwardly open corrugations as before. As in the form shown by Fig. 4, when the spring 213 is stressed into clutch engaging position its apex region is moved to the right so that a movement to the left of the releasing device 219 is required in the act of clutch release. The movement of the device 219 is effected by a suitable lever, not shown, but like that of Fig. 4. This form also requires a hairpin pressure plate releasing device. To that end U-shaped wires have their bights engaged in the hooked parts of the tongues 215 and their legs extend down through the corrugations, engaging in notches 221 of the anchor plate, substantially as in Fig. 4. Instead of a retaining device like 147 of Fig. 4, the legs extend toward the center where they engage the throw-out member 219. The movement of the member 219 to the left causes the hairpin levers to hinge at 221 and pull the pressure plate away from the flywheel while it is giving additional tension to the spring 213. To prevent the hairpin levers pressing the member 219 to the right, there is employed a tubular stamping 223 secured at 226 to part 219 at one end and its other end hooked over the edge of the spring as at 225.

It will be seen, therefore, that in this form the hairpin lever reacts against the throw-out member instead of against a part like 147 carried by the spring as in Fig. 4. This change has been found to constitute a very satisfactory embodiment of the means to release the pressure plate which may be called the "push" type of operating mechanism. The hairpin lever is preferably bent at 227 to overcome its tendency to be thrown out by centrifugal force. The stamping prevents relative movement between part 219 and the spring axially and also prevents relative rotation. The ratio of the arms of the hairpin lever in the opposite direction from its fulcrum point at 221 is substantially the same as the ratio of the radially extending parts of the spring from its contact with the anchor plate 209. In this way the hairpin lever is not required to bend during clutch operation. Preferably, too, the three points of contact of the hairpin lever lie in a straight line, forming an angle with the shaft axis of about one-half the angular motion imparted on clutch disengagement to thereby reduce slipping between the hairpin lever and the contact point.

The forms of the invention are quite similar. In each the long zero rate region is obtained by the corrugated structure of the spring element. In each case simplicity, reduction of cost and efficient operation are obtained. In each form the transmission of torque, the centering of the pressure plate, the prevention of radial movement is accomplished. In each the desired spring characteristics are obtained by the depth and circumferential extent of the corrugations.

Figure 10:
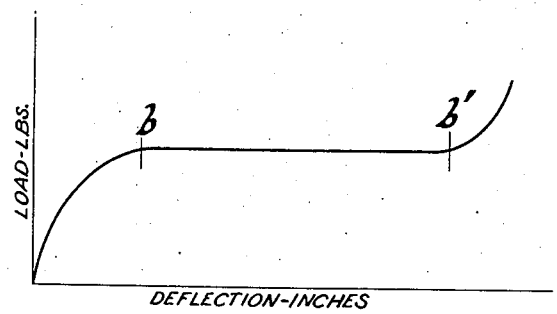
Figs. 10 and 11 are illustrative diagrams.
Figure 11:
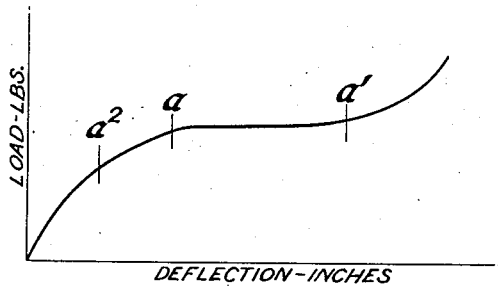

The invention may be considered to be an improvement on the clutch engaging spring shown in patent to Almen et al., 2,045,557, and also as an improvement over the clutch shown by A. W. Gardiner in his application Serial No. 718,896, Clutch, filed April 4, 1934. The relatively long zero rate of this new spring as compared with the spring shown by Patent 2,045,557, for example, has a very important advantage in clutch operation. This can be best explained by reference to the diagrams in Fig. 10 and Fig. 11. Fig. 11 shows the load-deflection curve of a normal Belleville spring like that of the patent referred to. Fig. 10 is the curve for a spring as herein shown, one having the radial corrugations. On Fig. 11 $a$, $a^1$ mark the limits of the region of zero rate. On Fig. 10, $b$, $b'$ mark the longer region of zero rate. The spring may be assumed to be coned when at rest and flattened in exerting pressure. If the clutch facings become worn, it is less deflected toward a flat formation when in clutch engaged position. The releasing mechanism must then begin its operation of deflecting the plate from a region of less deflection as from point $a^2$ in Fig. 11, for example. It therefore operates partly outside the region of zero rate. This disadvantage may be avoided by using a releasing pedal device having a lesser mechanical advantage, thereby keeping the spring action within the region of zero rate. Structurally this may be accomplished by suitably spacing rather far apart radially the circles of contact of the spring with the spring anchor and with the pressure plate. According to Fig. 10, however, the long zero rate region makes it possible to use a pedal having a high mechanical advantage as by locating the circles of contact of the pressure plate and spring anchorage at only slightly different radial distances and to do this while keeping the releasing action within the zero rate part of the curve $b$, $b'$ of Fig. 10.

We claim:

1. In a clutch, a driving member, a driven member, facings therefor, normally stressed yielding means to bias said members into frictional engagement, releasing mechanism to additionally stress said yielding means and release said clutch, said yielding means being an axially coned annulus having a substantially zero rate throughout its normal working range, and formations in said annulus to extend the range of zero rate beyond the normal working range whereby an advantageous mechanical advantage is afforded for the releasing mechanism.

2. In a clutch, driving and driven members, one of said members having parts having relative axial movement to engage and disengage the clutch, an axially bowed and radially corrugated annular spring to directly engage both said parts.

3. In a clutch, driving and driven members, an abutment member carried by one of said first mentioned members, a pressure plate movable to effect clutching engagement, a radially corrugated spring annulus to move said pressure plate, said pressure plate and abutment plate having part seated in opposed corrugations.

4. The invention defined by claim 3 together with other means located in said corrugations to positively move said pressure plate in a clutch releasing direction.

5. For use in a clutch having driving and driven members, one of said members having parts mounted for relative axial movement to grip the other member, a metallic axially bowed spring annulus having substantially radial corrugations to form oppositely facing grooves, said parts extending within said grooves whereby torque is transmitted between said parts.

6. For use with a clutch having an axially fixed abutment and a pressure plate movable to effect clutch engagement, an annular spring plate to move said pressure plate, said spring plate having radial corrugations of lesser width from its outer to its inner periphery.

7. The invention defined by claim 6, the spring engaging parts of the pressure plate and of the abutment plate being of unequal radial distance from the axial center of the clutch whereby the spring bias to effect clutch engagement is effected by a distortion of said annular spring.

8. In a clutch, a driving member, a driven member, a pressure plate movable axially to grip the driven member between itself and the driving member, said driving member having a spring anchorage, a normally stressed Belleville spring having alternating oppositely disposed radial corrugations, said anchorage and said pressure plate having radially spaced circular regions of contact with said corrugations, and means to additionally stress said spring to insure clutch releasing action.

9. The invention defined by claim 8, the region of contact between the anchorage and spring being radially less than the region of contact of the spring with the pressure plate.

10. The invention defined by claim 8, the region of contact between the anchorage and spring being radially less than the region of contact of the spring with the pressure plate together with lever means moved by said clutch releasing means pivoted on said anchorage and operable to withdraw said pressure plate.

11. In a clutch mechanism, a driving member, a driven member, Belleville spring means yieldingly urging the driving and driven members into driving engagement, said spring means having an inherent substantially zero rate within its operating range, and said yielding means having radial corrugations to abnormally extend the region of zero rate to permit clutch operation with a relatively high mechanical advantage.

12. In a clutch, a driving member, a driven member, a pressure plate movable axially to grip the driven member between itself and the driving member, said driving member having a spring anchorage, a normally stressed Belleville spring, said anchorage and said pressure plate having radially spaced circular regions of contact with said spring, and means to additionally stress said spring to insure clutch releasing action, the region of contact between the anchorage and spring being radially less than the region of contact of the spring with the pressure plate.

JOHN O. ALMEN.
HENRY J. KIRSCHNER.